United States Patent
An et al.

(10) Patent No.: US 7,315,975 B2
(45) Date of Patent: Jan. 1, 2008

(54) TRANSMISSION POWER CONTROL APPARATUS IN WIRELESS COMMUNICATION SYSTEM AND METHOD THEREFOR

(75) Inventors: Jong Hoo An, Seoul (KR); Ki Jun Kim, Anyang (KR); Young Woo Yun, Seoul (KR); Soon Yil Kwon, Kunpo (KR); Chan Ho Kyung, Inchon (KR); Suk Hyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 384 days.

(21) Appl. No.: 10/987,869

(22) Filed: Nov. 12, 2004

(65) Prior Publication Data
US 2005/0108615 A1    May 19, 2005

Related U.S. Application Data

(60) Provisional application No. 60/528,428, filed on Dec. 9, 2003, provisional application No. 60/527,374, filed on Dec. 5, 2003, provisional application No. 60/519,729, filed on Nov. 13, 2003.

(30) Foreign Application Priority Data

Nov. 22, 2003    (KR) ................. 10-2003-0083270

(51) Int. Cl.
*H04L 1/18* (2006.01)
(52) U.S. Cl. ...................... 714/751; 714/776
(58) Field of Classification Search ......... 714/751, 714/776
See application file for complete search history.

(56) References Cited

U.S. PATENT DOCUMENTS

| | | | | |
|---|---|---|---|---|
| 6,934,556 B2* | 8/2005 | Takano | ........ | 455/522 |
| 7,054,633 B2* | 5/2006 | Seo et al. | ........ | 455/439 |
| 2003/0153285 A1* | 8/2003 | Dekker | ........ | 455/104 |
| 2003/0185159 A1* | 10/2003 | Seo et al. | ........ | 370/278 |
| 2004/0013103 A1* | 1/2004 | Zhang et al. | ........ | 370/345 |
| 2004/0160933 A1* | 8/2004 | Odenwalder et al. | ........ | 370/342 |

FOREIGN PATENT DOCUMENTS

| | | |
|---|---|---|
| EP | 1341318 | 9/2003 |
| WO | WO03/034611 A2 | 4/2003 |
| WO | WO03/085878 A1 | 10/2003 |
| WO | WO03/096707 A2 | 11/2003 |

* cited by examiner

*Primary Examiner*—Jacques Louis-Jacques
*Assistant Examiner*—Esaw T. Abraham
(74) *Attorney, Agent, or Firm*—Lee, Hong, Degerman, Kang & Schmadeka (57) ABSTRACT

The present invention provides an apparatus and method for controlling transmission powers of R-CQICH (reverse-channel quality indicator channel) and R-ACKCH (reverse-acknowledgment channel) independently. The present invention includes the steps of receiving a first parameter corresponding to the R-CQICH and a second parameter corresponding to the R-ACKCH from a base station via an overhead message and independently determining transmission powers of the R-CQICH and the R-ACKCH using the first and second parameters.

20 Claims, 4 Drawing Sheets

| Field | Length(bits) |
|---|---|
| [....] | |
| RLGAIN_CQICH_PILOT | 6 |
| RLGAIN_ACKCH_PILOT | 6 |
| [....] | |

FIG. 5

TRANSMISSION POWER CONTROL APPARATUS IN WIRELESS COMMUNICATION SYSTEM AND METHOD THEREFOR

CROSS-REFERENCE TO RELATED APPLICATIONS

This application claims the benefit of the Korean Application No. P2003-83270 filed on Nov. 22, 2003, which is hereby incorporated by reference.

This application also claims the benefit of U.S. Provisional Application Ser. Nos. 60/519,729 filed on Nov. 13, 2003, and 60/527,374, filed on Dec. 5, 2003, and 60/528,428, filed on Dec. 9, 2003, the contents of which are hereby incorporated by reference herein in their entirety.

BACKGROUND OF THE INVENTION

1. Field of the Invention

The present invention relates to a power control method applicable to mobile communication systems, and more particularly, to a transmission power control apparatus and method using reverse channel quality indicator and acknowledgment indicator.

2. Discussion of the Related Art

In radio communications, channel environment varies according to the drift of mobile terminal's location. Hence, it is preferable that the modulation and coding scheme are modified to fit the channel quality for each situation.

With regard to setting a modulation scheme, when the channel quality is good (i.e., less interference), the communication system is able to use modulation enabling high-speed data transfer, such as QAM (quadrature amplitude modulation) and M-ary PSK (phase shift keying). However, in case that channel quality is poor, it is able to use such modulation as BPSK (binary phase shift key) resistant against interference.

With regard to setting a coding scheme, when the channel quality is good, less redundancy (thus, a high coding rate) is possible, so that data can be transmitted with higher data rate. However, when the channel environment is poor, the channel coding is performed with more redundancy (lower coding rate), so that data can be transmitted with a lower data rate.

In order to vary the modulation and coding scheme appropriately according to the variation of the channel quality, information about the current channel quality is needed. A forward channel quality is measured by a mobile terminal and is transmitted to a base station via a reverse channel quality indicator channel (R-CQICH). It should be noted that the term reverse channel is denoted as communication originating from a mobile terminal and transmitted to a network, such as a base station.

H-ARQ (hybrid automatic repeat request) is a method for improving reliability and throughput in a manner of combining ARQ (automatic repeat request) and FEC (forward error correction). ARQ is a method for improving transmission reliability in a manner of requesting retransmission of the same information until receiving errorless information if error exists in the transmitted information. And, FEC is a method for improving reliability in a manner of correcting errors having occurred during transmission.

During good channel quality, the frequency of errors in the received information is low. Hence, a retransmission is requested using ARQ, whereby reliability of the received information can be maintained. However, during poor channel quality, the frequency of errors in the received information is high. If ARQ is used without FEC, it may cause the increase of the number of retransmissions. Hence, the throughput of the system will be decreased since ARQ does not have any error-correction function.

Since such a problem can be solved by FEC, the H-ARQ system using both ARQ and FEC has been proposed. As one sort of H-ARQ, there is the IR (incremental redundancy) system. In the IR system, a transmitting side initially transmits data encoded with high coding rate which have small number of redundant bits. If the receiving side receives data with errors, it requests retransmission. In response to the request, the transmitting side transmits additional redundant bits, which are caused by low rate encoding.

A receiving side combines to decode the already received data and the redundant bits. In doing so, the retransmitted bits are to compensate the previously sent packet.

In the HARQ system of a wireless communication system, a mobile terminal decodes a received packet to check a presence or non-presence of errors and should feed back an ACK (acknowledgment) or NAK (negative acknowledgment) signal to a base station according to a result of the check. A base station having received the NAK signal retransmits the packet. By combining to decode the retransmitted packet and the initially transmitted packet, the mobile terminal has a diversity or coding gain. The ACK/NAK signal transmitted from the mobile terminal to the base station is transmitted to the base station via a reverse acknowledgment channel (R-ACKCH).

In a typical wireless communication system, nominal attribute gain for R-ACKCH is set to −3 dB. During the course of implementation, it has been determined that this gain was set too low for a proper ACK operation. In other words, current nominal attribute gain for R-ACKCH makes false alarm probability (probability that the base station receiver detects ACK even when the transmitter does not transmit anything on R-ACKCH) too high resulting in a large number of RLP retransmissions.

To identify the problem, simulations were performed with current nominal adjustment gain value for R-ACKCH under AWGN channel. The simulations were performed with 9600 bps R-FCH on top of R-ACKCH. The pilot level was power controlled so that 1% FER could be achieved for R-FCH.

Figure 1:
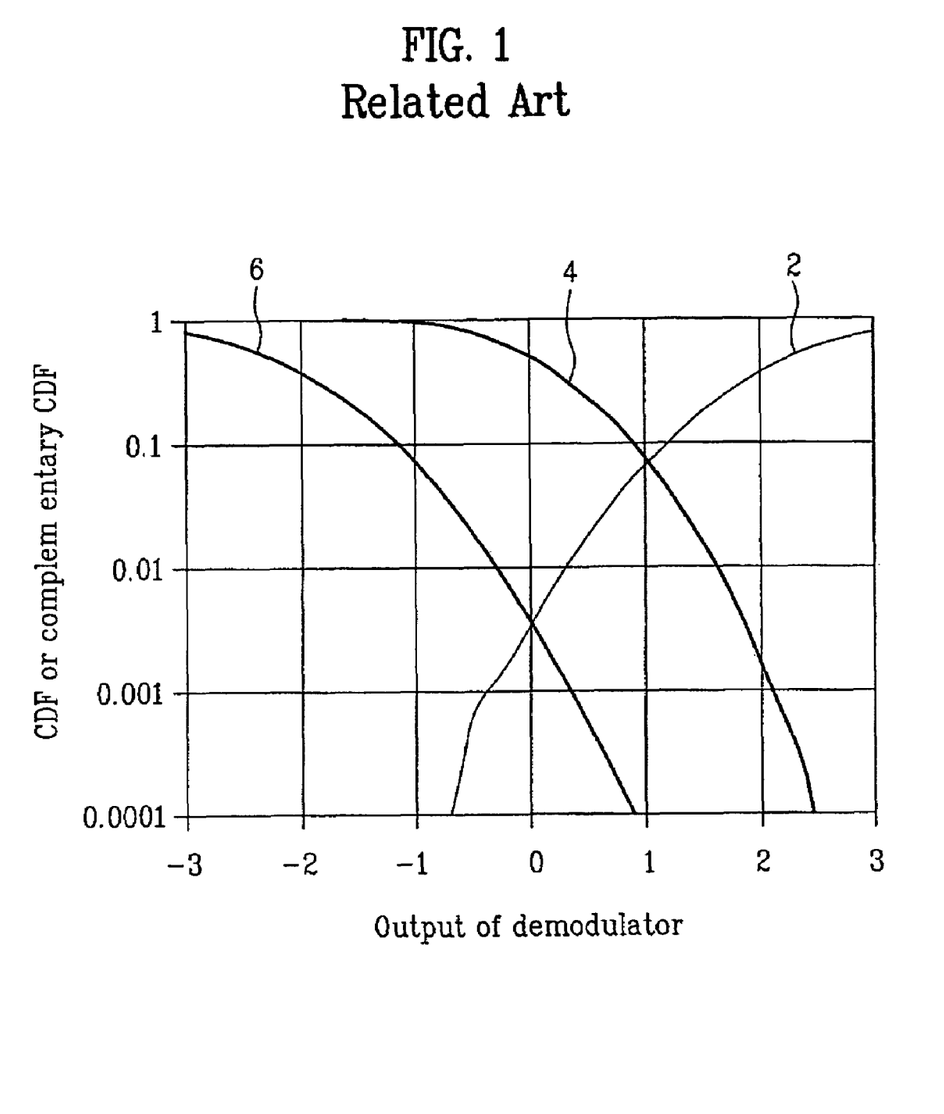
FIG. 1 is simulation results with R-ACKCH nominal attribute gain of −3 dB.

In FIG. 1, the line 2 represents the CDF of demodulator output when ACK signal is transmitted. The line 4 is the complementary CDF of demodulator output when the transmitter does not transmit anything. The line 6 is the complementary CDF of demodulator output when NAK signal is transmitted.

For ease of explanation, the following probabilities can be defined.

$P_{A-N}$: Probability that the ACK signal is falsely detected as NAK.

$P_{N-A}$: Probability that the NAK signal is falsely detected as ACK.

$P_{No-A}$: Probability that the receiver detects ACK signal even when the mobile station doesn't transmit anything on R-ACKCH.

In this example, it is assumed that one threshold is given to the output of base station demodulator so that the base station detects ACK or NAK. It should be noted that 'no signal' does not need to be differentiated from 'NAK' since the base station behavior might be the same for these two cases. The criteria used for determining the threshold level is to maintain the $P_{A-N}$ and $P_{N-A}$ below certain level. The choice of this level should be implementation dependent. However, $P_{A-N}$ of 0.01 seems to be reasonable choice. From FIG. 1, $P_{N-A}$ is 0.001 for this threshold, which seems quite reasonable. However, it turns out that $P_{No-A}$ is 0.3, which is a bit high for proper operation. The high $P_{No-A}$ may lead to some erroneous event.

The erroneous event due to this false alarm on R-ACKCH can be explained as follows. When a mobile terminal completely misses the forward packet data control channel given to it, the mobile terminal will not transmit any signal on the R-ACKCH. For about 30% of these situations, the base station falsely decides that ACK signal was transmitted from the mobile terminal and is going to proceed with new packet for that ARQ channel, resulting in RLP layer retransmission for that packet. Therefore, it is suggested that the channel gain (i.e., transmission power) for R-ACKCH needs to be modified to resolve this problem.

Transmission power of R-CQICH is determined using a R-CQICH power adjustment gain and a R-ACKCQICH gain to a pilot power (RLGAIN_ACKCQICH_PILOT). The R-CQICH power adjustment gain is individually transmitted to each mobile terminal from a base station. And, the R-ACKCQICH gain to a pilot power is commonly transmitted to the all mobile terminals from the base station.

Similarly, transmission power of R-ACKCH is determined using a R-ACKCH power adjustment gain and a R-ACKCQICH gain to a pilot power (RLGAIN_ACKCQICH_PILOT). The R-ACKCH power adjustment gain is individually transmitted to each mobile terminal from a base station. And, the R-ACKCQICH gain to a pilot power is commonly transmitted to all the mobile terminals from the base station.

As mentioned in the foregoing description, in determining each of the R-CQICH and R-ACKCH transmission powers, the R-ACKCQICH gain to a pilot power (RLGAIN_ACKCQICH_PILOT) is commonly used. However, because the common factor (RLGAIN_ACKCQICH_PILOT) is used in determining both the R-CQICH and the R-ACKCH transmission powers, the following problems are inevitable.

For all mobile terminals in a cell, it may occur that the transmission power of R-ACKCH needs to be increased but the transmission power of R-CQICH need to be maintained. In such a case, the R-ACKCH power adjustment gain should be transmitted to all mobile terminals in the cell individually.

This is because the transmission power of R-CQICH is increased as well as that of R-ACKCH, if the R-ACKCQICH gain to a pilot power (RLGAIN_ACKCQICH_PILOT) is transmitted to all mobile terminals in a cell using an overhead message.

For instance, in detecting ACK/NAK, the base station performs a threshold detection using the receiving power of R-ACKCH. Hence, in case that the transmission power of R-ACKCH is too small, the base station may incorrectly detect No-signal as NAK. If the R-ACKCQICH gain to a pilot power (RLGAIN_ACKCQICH_PILOT) is transmitted to all mobile terminals to solve the problem, the transmission power of R-CQICH is unnecessarily increased to be inefficient. Meanwhile, if the base station transmits the R-ACKCH power adjustment gain to each of the mobile terminals, a message load transmitted to the mobile terminal increases and the corresponding transmission process gets very complicated.

SUMMARY OF THE INVENTION

Accordingly, the present invention is directed to a transmission power control method of R-CQICH (reverse-channel quality indicator channel) and R-ACKCH (reverse-acknowledgment channel) that substantially obviates one or more problems due to limitations and disadvantages of the related art.

An object of the present invention is to provide an apparatus and method for controlling transmission powers of R-CQICH (reverse-channel quality indicator channel) and R-ACKCH (reverse-acknowledgment channel) independently.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling transmission power in a mobile communication system comprises receiving a packet data from a network and determining whether the packet data is received correctly, receiving a first gain value (for example, RLGAIN_ACKCH_PILOT) and a second gain value (for example, RLGAIN_CQICH_PILOT) from the network, wherein the first gain value is associated with controlling transmission power for transmitting data acknowledge information (ACK), and the second gain value is associated with controlling transmission power for transmitting channel quality information independent from the first gain value, and the first and second gain values are capable of being received by a plurality of mobile terminals associated with the network; and determining an acknowledgement channel power by using at least a nominal reverse acknowledgment channel attribute gain and the first gain value.

According to one aspect of the present invention, the method further comprises determining a channel quality indicator channel power by using at least a nominal reverse channel quality indicator channel attribute gain and the second gain value.

According to another aspect of the present invention, at least one of the first gain value and the second gain value is received through an overhead message from the network, the overhead message capable of being received by mobile terminals in at least one cell controlled by the network. Preferably, the overhead message comprises at least one of ESPM (Extended System Parameters Message) and MCR-RPM (MC-RR Parameters Message). The first and the second gain values are transmitted using at least one of UHDM (Universal Handoff Direction Message) and ECAM (Extended Channel Assignment Message).

According to another aspect of the present invention, the acknowledgment channel power is determined by:

acknowledgment channel power=mean pilot channel output power+Y*(Nominal_Reverse_Acknowledgement_Channel_Attribute_Gain+Reverse_Channel_Adjustment_Gain for the acknowledgment channel−Multiple_Channel_Adjustment_Gain for the acknowledgment channel+first gain value), wherein the mean pilot channel output power is a mean power value of a reverse pilot channel, the Y is a constant, the Nominal_Reverse_Acknowledgement_Channel_Attribute_Gain is a gain value previously known to the network and the mobile terminal, the Reverse_Channel_Adjustment_Gain[R-ACKCH] is a gain value that the network informs each mobile terminal via message, the Multiple_Channel_Adjustment_Gain is a gain value used when at least two code channels are assigned to the mobile terminal as well as the reverse pilot channel, wherein the value of Y is preferably 0.125.

According to one aspect of the present invention, the method further comprises determining a channel quality indicator channel power by using at least a nominal reverse channel quality indicator channel attribute gain and the second gain value.

According to another aspect of the present invention, the channel quality indicator channel power is determined by:

channel quality indicator channel power=mean pilot channel output power+Y*(Nominal_Reverse_Channel_Quality_Indicator_Channel_Attribute_Gain+Reverse_Channel_Quality_Indicator_ Channel_Attribute_Adjustment_Gain+Reverse_Channel_ Adjustment_Gain for a channel quality indicator channel−Multiple_Channel_Adjustment_Gain for the channel quality indicator channel+second gain value), wherein the mean pilot channel output power is a mean power value of a reverse pilot channel, the Y is a constant, the Nominal_Reverse_ Channel_Quality_Indicator_ Channel_Attribute_Gain is a gain value previously known to the network and the mobile terminal, the Reverse_Channel_Quality_Indicator_Channel_ Attribute_Adjustment_Gain is a gain value that the network informs each mobile terminal via message, the Reverse_Channel_Adjustment_Gain is a gain value that the network informs each terminal via message, the Multiple_Channel_Adjustment_Gain is a gain value used when at least two code channels are assigned to the mobile terminal as well as the reverse pilot channel. The value of Y is preferably 0.125.

A mobile terminal for controlling transmission power in a mobile communication system comprises means for receiving a packet data from a network and determining whether the packet data is received correctly; means for receiving a first gain value and a second gain value from the network, wherein the first gain value is associated with controlling transmission power for transmitting data acknowledge information, and the second gain value is associated with controlling transmission power for transmitting channel quality information independent from the first gain value, and the first and second gain values are capable of being received by a plurality of mobile terminals associated with the network; and means for determining an acknowledgement channel power by using at least a nominal reverse acknowledgment channel attribute gain and the first gain value.

According to another embodiment of the present invention, a method of controlling transmission power comprises transmitting a packet data to a mobile terminal; transmitting a first gain value and a second gain value to the mobile terminal, wherein the first gain value is associated with controlling transmission power for transmitting data acknowledge information, and the second gain value is associated with controlling transmission power for transmitting channel quality information independent from the first gain value, and the first and second gain values are capable of being received by a plurality of mobile terminals associated with the network; and receiving the data acknowledgment information from the mobile terminal through an acknowledgement channel transmitted at acknowledgement channel power determined by the mobile terminal using at least a nominal reverse acknowledgment channel attribute gain and the first gain value.

According to one aspect of the present invention, the network further comprises receiving a channel quality indicator through a channel quality indicator channel transmitted by the mobile terminal with channel quality indicator channel power determined by using at least a nominal reverse channel quality indicator channel attribute gain and the second gain value.

Therefore, the present invention enables to efficiently control the transmission powers of the R-CQICH and R-ACKCH. Also, the present invention reduces overhead messages being transmitted from the base station to the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Although the present invention is illustrated with respect to a mobile terminal, it is contemplated that the present invention may be utilized anytime it is desired to provide new transport configurations for establishing a connection between a mobile communication device and a network (also referred to as a base station).

Figure 2:
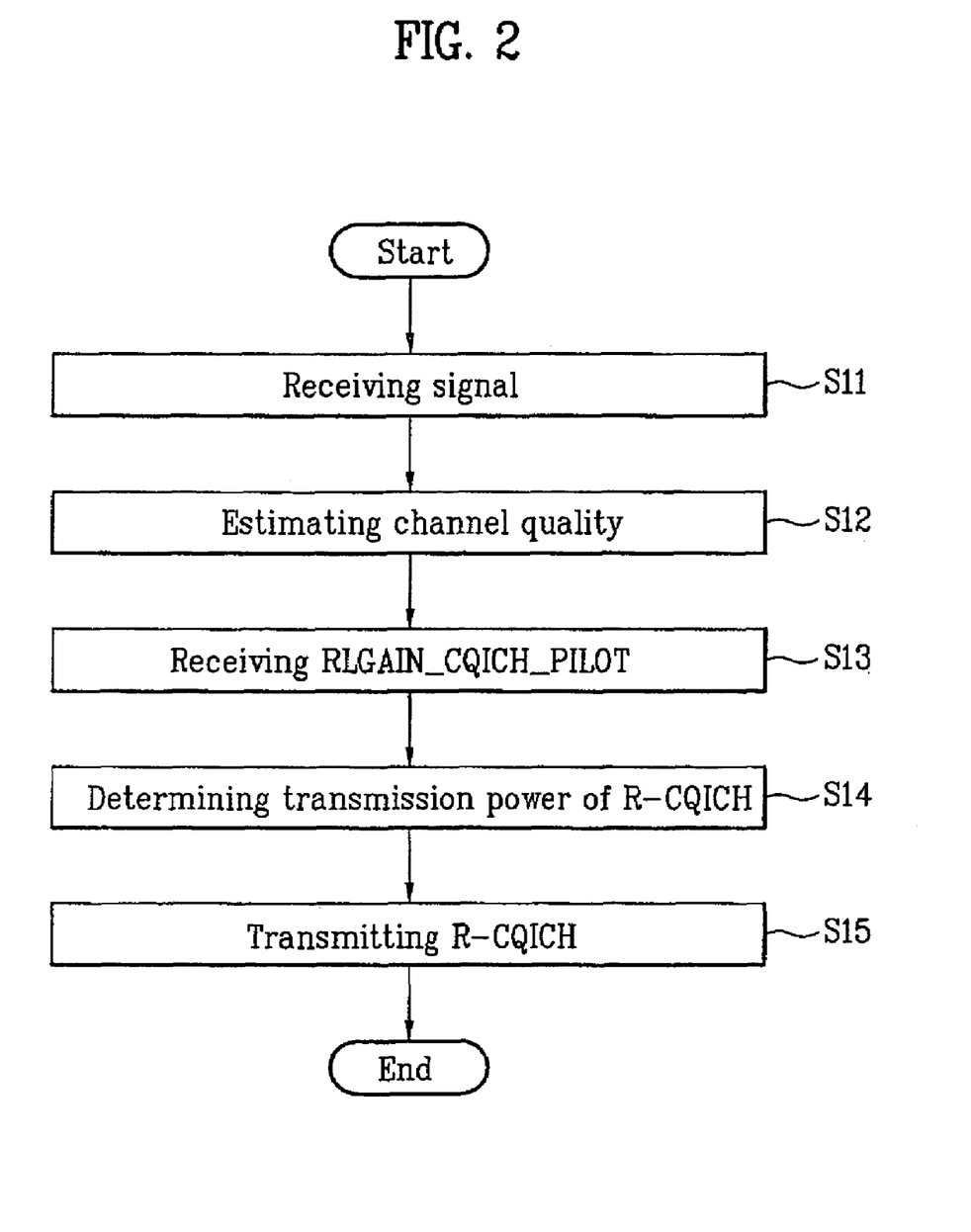
FIG. 2 is a flowchart of a transmission power control method of R-CQICH.

FIG. 2 is a flowchart of a transmission power control method for R-CQICH. Referring to FIG. 2, a mobile terminal receives a signal transmitted from a base station (S11) and then estimates a current forward channel quality (S12). And, the mobile terminal computes an R-CQICH transmission power using a CQICH power gain to a reverse pilot power value RLGAIN_CQICH_PILOT received from the base station (S13, S14). It should be noted that the steps of estimating the current forward channel quality (S12) and receiving RLGAIN_CQICH_PILOT from the base station (S13) may be interchanged.

Preferably, the transmission power of R-CQICH is computed using Equation 1.

$$P_{RCQICH} = \text{mean pilot channel output power} + 0.125 *$$
$$(\text{Nominal\_Reverse\_Channel\_Quality\_Indicator\_Channel\_Attribute\_Gain} + \text{Reverse\_Channel\_Quality\_Indicator\_Channel\_Attribute\_Adjustment\_Gain} + \text{Reverse\_Channel\_Adjustment\_Gain[R-CQICH]} - \text{Multiple\_Channel\_Adjustment\_Gain[R-CQICH]} + \text{RLGAIN\_CQICH\_PILOT})$$

[Equation 1]

In Equation 1, the mean pilot channel output power is a mean power value of a reverse pilot channel, Nominal_Reverse_Channel_Quality_Indicator_Channel_Attribute_Gain is a gain value previously known to a base station and a mobile terminal, Reverse_Channel_Quality_Indicator_Channel_Attribute_Adjustment_Gain[R-CQICH] is a gain value that the base station informs each mobile terminal via message if necessary, Reverse_Channel_Adjustment_Gain[R-CQICH] is a gain value that the base station informs each mobile terminal via message if necessary, Multiple_Channel_Adjustment_Gain[R-CQICH] is a gain value used when at least two code channels are assigned to the mobile terminal as well as the reverse pilot channel, and RLGAIN_CQICH_PILOT is a gain value of R-CQICH power to a reverse pilot channel power that the base station informs the all mobile terminals in a cell via an overhead message.

Figure 3:
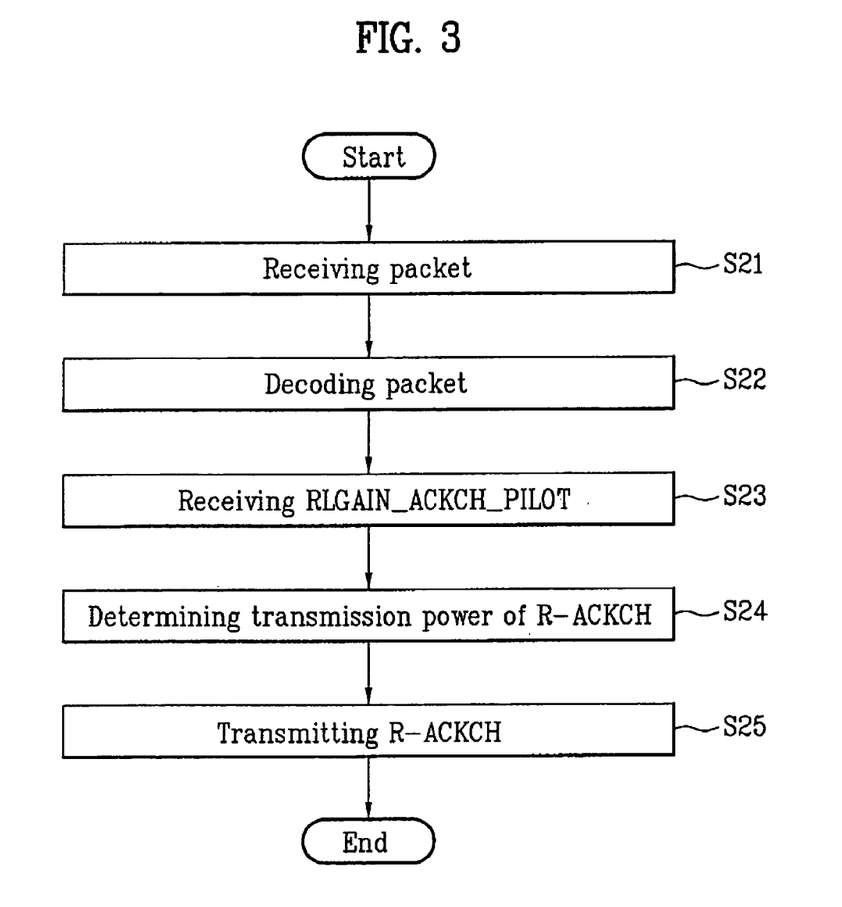
FIG. 3 is a flowchart of a transmission power control method of R-ACKCH.

FIG. 3 is a flowchart of a transmission power control method for R-ACKCH. Referring to FIG. 3, data are preferably transmitted at high data rate between the base station and the mobile terminal in a following manner.

A base station transmits a packet to a mobile terminal. And, the mobile terminal having received the packet (S21) performs decoding thereon (S22).

If the decoding is successful (S22) (i.e., there is no error in the decoded data), the mobile terminal transmits an acknowledgment (ACK) signal to the base station to inform the successful decoding. The base station having received the ACK signal transmits a next packet.

If the decoding fails (S22), the mobile terminal transmits a non-acknowledgement (NAK) signal to the base station to inform the decoding failure (S25). The base station having received the NAK signal retransmits the packet.

The ACK/NAK signal is transmitted via a R-ACKCH. The transmission power of R-ACKCH is computed using the ACKCH power gain to a reverse pilot power value (RLGAIN_ACKCH_PILOT) received from the base station (S23, S24). And, the ACK/NAK signal is transmitted to the base station with the computed transmission power (S25).

Preferably, the transmission power of R-ACKCH is computed using Equation 2.

$$P_{ACKCH} = \text{mean pilot channel output power} + 0.125 *$$
$$(\text{Nominal\_Reverse\_Acknowledgement\_Channel\_Attribute\_Gain} + \text{Reverse\_Channel\_Adjustment\_Gain[R-ACKCH]} - \text{Multiple\_Channel\_Adjustment\_Gain[R-ACKCH]} + \text{RLGAIN\_ACKCH\_PILOT})$$

[Equation 2]

In Equation 2, the mean pilot channel output power is a mean power value of a reverse pilot channel, Nominal_Reverse_Acknowledgement_Channel_Attribute_Gain is a gain value previously known to a base station and mobile terminal, Reverse_Channel_Adjustment_Gain[R-ACKCH] is a gain value that the base station informs each mobile terminal via message if necessary, Multiple_Channel_Adjustment_Gain[R-ACKCH] is a gain value used when at least two code channels are assigned to the mobile terminal as well as the reverse pilot channel, and RLGAIN_ACKCH_PILOT as a gain value of R-ACKCH power to a reverse pilot channel power that the base station informs the all mobile terminals in a cell via an overhead message.

Figure 4:
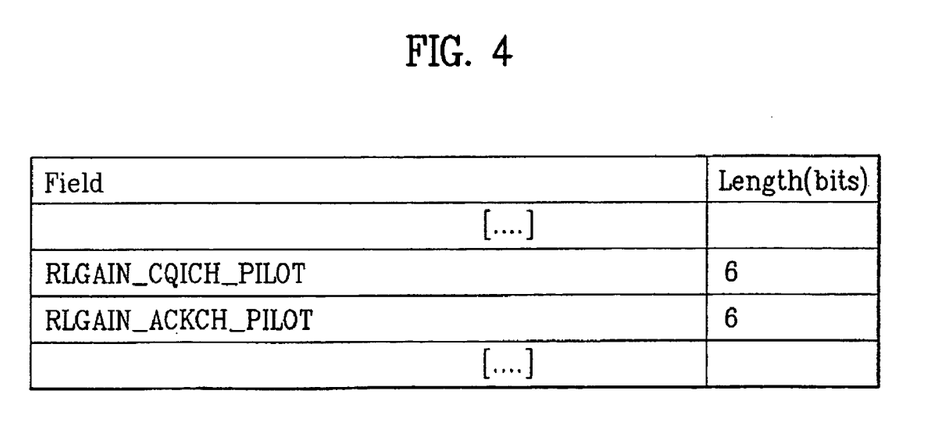
FIG. 4 is an exemplary diagram of an overhead message format including RLGAIN_CQICH_PILOT and RLGAIN_ACKCH_PILOT values.

FIG. 4 is an exemplary diagram of an overhead message format including RLGAIN_CQICH_PILOT and RLGAIN_ACKCH_PILOT values. Such message is transmitted from a base station to a mobile station residing in a cell controlled by such base station.

Referring to FIG. 4, RLGAIN_CQICH_PILOT and RLGAIN_ACKCH_PILOT values for computing the transmission powers of R-CQICH and R-ACKCH, respectively, can be transmitted using one or more fields of ESPM (Extended System Parameters Message), MCRRPM (MC-RR Parameters Message), UHDM (Universal Handoff Direction Message), and ECAM (Extended Channel Assignment Message). The ESPM and MCRRPM are common channel messages which are provided to a plurality of mobile terminals in a cell. On the other hand, UHDM and ECAM are dedicated messages which are provided to a specific mobile terminal in a cell.

Accordingly, the present invention efficiently controls the transmission powers of each of the R-CQICH and R-ACKCH. And, the present invention reduces the amount of data being transmitted from the base station to the mobile terminal.

Figure 5:
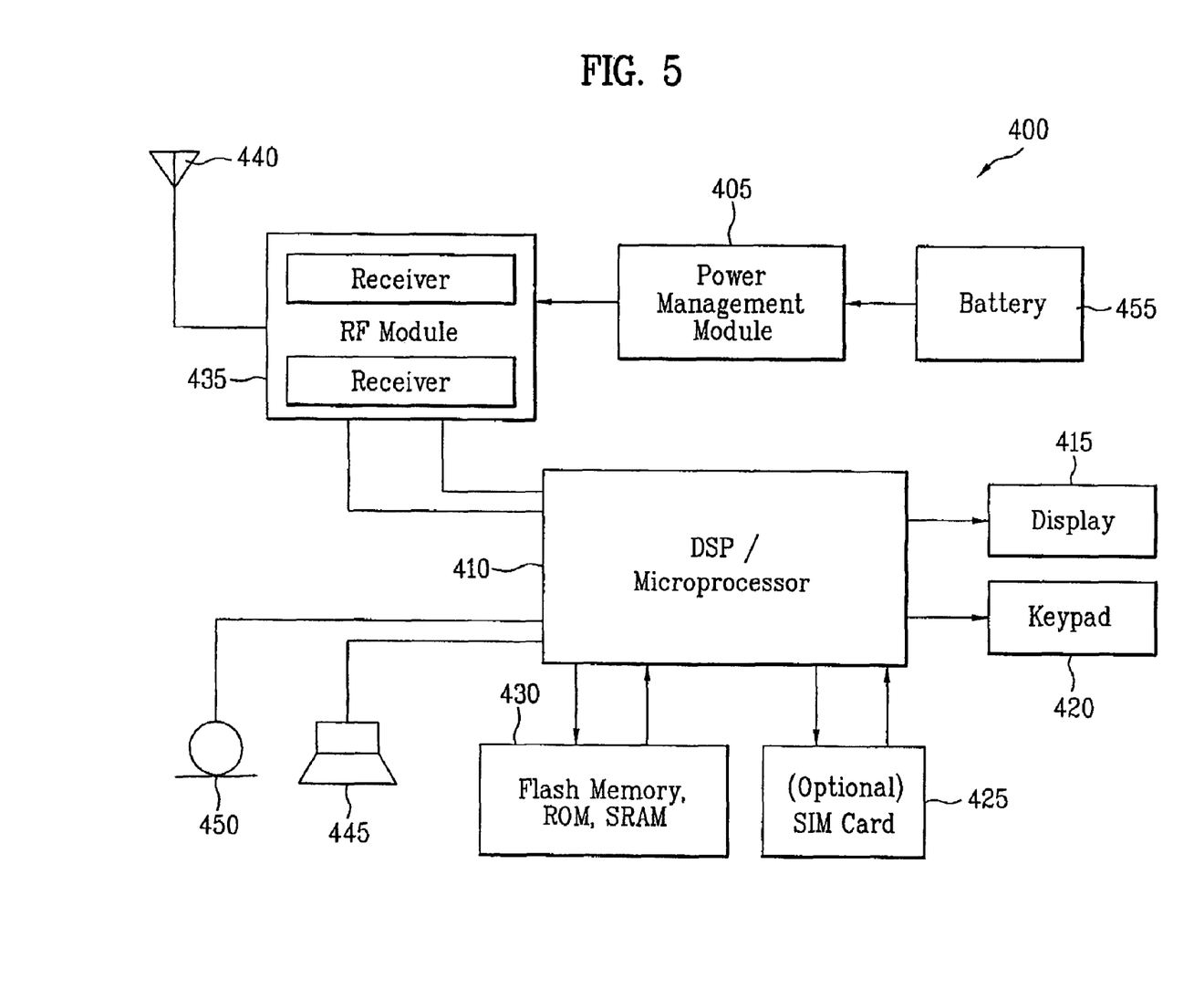
FIG. 5 illustrates a mobile communication device according to one embodiment of the present invention.

Referring to FIG. 5, a block diagram of a mobile communication device 400 of the present invention is illustrated, for example a mobile phone for performing the methods of the present invention. The mobile communication device 400 includes a processing unit 410 such as a microprocessor or digital signal processor, an RF module 435, a power management module 405, an antenna 440, a battery 455, a display 415, a keypad 420, a storage unit 430 such as flash memory, ROM or SRAM, a speaker 445, a microphone 450, and, optionally, a SIM card 425.

A user enters instructional information, such as a telephone number, for example, by pushing the buttons of the keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF section 435, to initiate communication, for example, by transmitting radio signals comprising voice communication data. The RF module 435 includes a receiver and a transmitter to receive and transmit radio signals. The antenna 440 facilitates the transmission and reception of radio signals. Upon receiving radio signals, the RF module 435 may forward and convert the signals to baseband frequency for processing by the processing unit 410. The processed signals may be transformed into audible or readable information output, for example, via the speaker 445.

It will be apparent to one skilled in the art that the steps described in FIGS. 2-4 may be readily implemented using, for example, the processing unit 410 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as CDMA. The present invention is also applicable to other wireless communication systems using different air interfaces and/or physical layers, for example, TDMA, FDMA, WCDMA, UMTS, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling transmission power in a mobile communication system, the method comprising:
receiving a packet data from a network and determining whether the packet data is received correctly;
receiving a first gain value and a second gain value from the network, wherein the first gain value is associated with controlling transmission power for transmitting data acknowledge information, and the second gain value is associated with controlling transmission power for transmitting channel quality information, and the first gain value and the second gain value are independent from each other, and the first and second gain values are received by a plurality of mobile terminals associated with the network; and
determining an acknowledgement channel power by using at least a nominal reverse acknowledgment channel attribute gain and the first gain value.

2. The method of claim 1, further comprising:
determining a channel quality indicator channel power by using at least a nominal reverse channel quality indicator channel attribute gain and the second gain value.

3. The method of claim 2, wherein the channel quality indicator channel power is determined by:
channel quality indicator channel power=mean pilot channel output power+Y*(Nominal _Reverse_Channel_Quality_Indicator_Channel_Attribute_Gain+Reverse_Channel_Quality_Indicator_ Channel_Attribute_Adjustment_Gain+Reverse_Channel_Adjustment_Gain for a channel quality indicator channel−Multiple_Channel_Adjustment_Gain for the channel quality indicator channel+second gain value),
wherein the mean pilot channel output power is a mean power value of a reverse pilot channel, the Y is a constant, the Nominal_Reverse_Channel_Quality$_{Indicator}$_Channel_Attribute_Gain is a gain value previously known to the network and the mobile terminal, the Reverse_Channe_Quality_Indicator_Channel_Attribute_Adjustment_Gain is a gain value that the network informs each mobile terminal via message, the Reverse_Channel_Adjustment_Gain is a gain value that the network informs each terminal via message, the Multiple_Channel_Adjustment_Gain is a gain value used when at least two code channels are assigned to the mobile terminal as well as the reverse pilot channel.

4. The method of claim 3, wherein Y is 0.125.

5. The method of claim 1, wherein at least one of the first gain value and the second gain value is received through an overhead message from the network.

6. The method of claim 5, wherein the overhead message comprises at least one of ESPM (Extended System Parameters Message) and MCRRPM (MC-RR Parameters Message).

7. The method of claim 1, wherein the first and the second gain values are transmitted using at least one of UHDM (Universal Handoff Direction Message) and ECAM (Extended Channel Assignment Message).

8. The method of claim 1, wherein the acknowledgment channel power is determined by:
acknowledgment channel power=mean pilot channel output power+Y*(Nominal_Reverse_Acknowledgement_Channel_Attribute_Gain+Reverse_Channel Adjustment_Gain for an acknowledgment channel−Multiple_Channel Adjustment_Gain for the acknowledgment channel+first gain value),
wherein the mean pilot channel output power is a mean power value of a reverse pilot channel, the Y is a constant, the Nominal_Reverse_Acknowledgement_Channel_Attribute_Gain is a gain value previously known to the network and the mobile terminal, the Reverse_Channel Adjustment_Gain is a gain value that the network informs each mobile terminal via message, the Multiple_Channel_Adjustment_Gain is a gain value used when at least two code channels are assigned to the mobile terminal as well as the reverse pilot channel.

9. The method of claim 8, wherein Y is 0.125.

10. The method of claim 1, wherein the first gain value is RLGAIN_ACKCH_PILOT, and the second gain value is RLGAIN_OQICH_PILOT, wherein RLGAIN_ACKCH_PILOT is acknowledgement channel power gain to a reverse pilot power value, and RLGAIN_CQICH_PILOT is channel quality information channel gain to a reverse pilot power value.

11. A method of controlling transmission power in a mobile communication system, the method comprising:
transmitting a packet data to a mobile terminal;

transmitting a first gain value and a second gain value to the mobile terminal, wherein the first gain value is associated with controlling transmission power for transmitting data acknowledge information, and the second gain value is associated with controlling transmission power for transmitting channel quality information, and the first gain value and the second gain value are independent from each other, and the first and second gain values are received by a plurality of mobile terminals associated with the network; and receiving the data acknowledgment information from the mobile terminal through an acknowledgment channel transmitted at acknowledgement channel power determined by the mobile terminal using at least a nominal reverse acknowledgment channel attribute gain and the first gain value.

12. The method of claim 11, further comprising:
receiving a channel quality indicator through a channel quality indicator channel transmitted by the mobile terminal with channel quality indicator channel power determined by using at least a nominal reverse channel quality indicator channel attribute gain and the second gain value.

13. The method of claim 12, wherein the channel quality indicator channel power is determined by:

channel quality indicator channel power=mean pilot channel output power+Y*(Nominal_Reverse_Channel_Quality_Indicator_Channel_Attribute_Gain+Reverse_Channel_Quality_Indicator_Channel_ Attribute_ Adjustment_Gain+Reverse_Channel_ Adjustment_Gain for a channel quality indicator channel−Multiple_Channel_Adjustment_Gain for the channel quality indicator channel+second gain value), wherein the mean pilot channel output power is a mean power value of a reverse pilot channel, the Y is a constant, the Nominal_Reverse_Channel_ Quality$_{Indicator}$_Channel_Attribute_Gain is a gain value previously known to the network and the mobile terminal, the Reverse_Channel_Quality_Indicator_Channel_ Attribute_Adjustment_Gain is a gain value that the network informs each mobile terminal via message, the Reverse_Channel_Adjustment_Gain is a gain value that the network informs each terminal via message, the Multiple Channel_Adjustment_Gain is a gain value used when at least two code channels are assigned to the mobile terminal as well as the reverse pilot channel.

14. The method of claim 13, wherein Y is 0.125.

15. The method of claim 11, wherein at least one of the first gain value and the second gain value is transmitted through an overhead message.

16. The method of claim 15, wherein the overhead message comprises at least one of ESPM (Extended System Parameters Message) and MCRRPM (MC-RR Parameters Message).

17. The method of claim 11, wherein the first and the second gain values are transmitted using at least one of UHDM (Universal Handoff Direction Message) and ECAM (Extended Channel Assignment Message).

18. The method of claim 11, wherein the acknowledgment channel power is determined by:

acknowledgment channel power=mean pilot channel output power+Y*(Nominal_Reverse_Acknowledgement_Channel_Attribute_Gain+Reverse_Channel_ Adjustment_Gain for an acknowledgment channel−Multiple_Channel_Adjustment_Gain for the acknowledgment channel+first gain value), wherein the mean pilot channel output power is a mean power value of a reverse pilot channel, the Y is a constant, the Nominal_Reverse_Acknowledgement_Channel_Attribute_Gain is a gain value previously known to the network and the mobile terminal, the Reverse_Channel_Adjustment_Gain[R-ACKCH] is a gain value that the network informs each mobile terminal via message, the Multiple_Channel_Adjustment_Gain is a gain value used when at least two code channels are assigned to the mobile terminal as well as the reverse pilot channel.

19. The method of claim 18, wherein Y is 0.125.

20. The method of claim 11, wherein the first gain value is RLGAIN_ACKCH_PILOT, and the second gain value is RLGAIN_CQICH_PILOT, wherein RLGAIN_ACKCH_PILOT is acknowledgement channel power gain to a reverse pilot power value, and RLGAIN_CQICH_PILOT is channel quality information channel gain to a reverse pilot power value.

* * * * *